United States Patent
Mizuno et al.

(10) Patent No.: US 11,257,609 B2
(45) Date of Patent: Feb. 22, 2022

(54) WIRE HARNESS INCLUDING ELECTRICAL WIRES DISPOSED BETWEEN SHEET MATERIAL AND COVER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Housei Mizuno, Mie (JP); Daichi Fukushima, Mie (JP); Miyu Aramaki, Mie (JP); Shinya Sadohara, Mie (JP); Ryuta Takakura, Mie (JP); Tetsuya Nishimura, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 17/040,755

(22) PCT Filed: Mar. 26, 2019

(86) PCT No.: PCT/JP2019/012846
§ 371 (c)(1),
(2) Date: Sep. 23, 2020

(87) PCT Pub. No.: WO2019/189177
PCT Pub. Date: Oct. 3, 2019

(65) Prior Publication Data
US 2021/0020331 A1    Jan. 21, 2021

(30) Foreign Application Priority Data
Mar. 27, 2018 (JP) .............................. JP2018-059194

(51) Int. Cl.
*H01B 7/18* (2006.01)
*H01B 7/02* (2006.01)
(Continued)

(52) U.S. Cl.
CPC ........... *H01B 7/18* (2013.01); *B60R 16/0207* (2013.01); *H01B 7/0045* (2013.01); *H01B 7/02* (2013.01);
(Continued)

(58) Field of Classification Search
CPC ........ H01B 7/00; H01B 7/0045; H01B 7/188; H01B 7/228; H01B 11/1033; H02G 3/04;
(Continued)

(56) References Cited

U.S. PATENT DOCUMENTS

| | | | | |
|---|---|---|---|---|
| 3,023,692 A | * | 3/1962 | Crown | H02G 3/0456 100/1 |
| 3,733,428 A | * | 5/1973 | Fry | H01B 7/0846 174/72 A |

(Continued)

FOREIGN PATENT DOCUMENTS

| | | |
|---|---|---|
| CN | 101151684 | 3/2008 |
| CN | 102396039 | 3/2012 |

(Continued)

OTHER PUBLICATIONS

International Search Report (ISR) issued in International Patent Application No. PCT/JP2019/012846, dated Jun. 18, 2019, along with an English translation thereof.

(Continued)

*Primary Examiner* — Timothy J Thompson
*Assistant Examiner* — Michael F McAllister
(74) *Attorney, Agent, or Firm* — Greenblum & Bernstein, P.L.C.

(57) ABSTRACT

A wire harness includes an electrical wire, a sheet material welded to an insulating covering of the electrical wire (Continued)

disposed on a main surface, and a cover fixed to the sheet material. The cover covers at least part of the electrical wire disposed on the sheet material along a longitudinal direction of the electrical wire from an opposite side of the electrical wire from the sheet material.

11 Claims, 5 Drawing Sheets

(51) Int. Cl.
    *B60R 16/02*     (2006.01)
    *H01B 7/00*     (2006.01)
    *H01B 7/08*     (2006.01)

(52) U.S. Cl.
    CPC .......... *H01B 7/0838* (2013.01); *H01B 7/1875* (2013.01)

(58) Field of Classification Search
    CPC ...... H02G 3/0462; H05K 9/00; H05K 9/0098; H05K 9/0043; H01R 13/6596
    USPC ........................................................ 174/72 A
    See application file for complete search history.

(56) References Cited

U.S. PATENT DOCUMENTS

| | | | | |
|---|---|---|---|---|
| 3,819,848 A | * | 6/1974 | Fry | ...................... H01B 7/0838 |
| | | | | 174/72 A |
| 9,666,333 B2 | * | 5/2017 | Omura | ................. H01B 7/1855 |
| 2002/0096358 A1 | * | 7/2002 | Murakami | ......... H01B 11/1091 |
| | | | | 174/251 |
| 2008/0190544 A1 | * | 8/2008 | Hopf | ........................ H02G 3/30 |
| | | | | 156/73.5 |

FOREIGN PATENT DOCUMENTS

| | | |
|---|---|---|
| JP | 49-67196 | 6/1974 |
| JP | 10-26022 | 1/1998 |
| JP | 10-188682 | 7/1998 |
| JP | 2000-100255 | 4/2000 |
| JP | 2015-72798 | 4/2015 |

OTHER PUBLICATIONS

International Preliminary Report on Patentability (IPRP) issued in International Patent Application No. PCT/JP2019/012846, dated Oct. 8, 2020, along with an English translation thereof.
China Office Action issued in China Patent Application No. 201980021583.7, dated Jul. 6, 2021, together with English translation thereof.
Japan Office Action issued in Japan Patent Application No. 2020-510908, dated Aug. 31, 2021, together with English translation thereof.
China Office Action issued in China Patent Application No. 201980021583.7, dated Oct. 22, 2021, together with English translation thereof.

* cited by examiner

WIRE HARNESS INCLUDING ELECTRICAL WIRES DISPOSED BETWEEN SHEET MATERIAL AND COVER

TECHNICAL FIELD

The present disclosure relates to a technique of attaching electrical wires to an exterior member in a wire harness for vehicle.

BACKGROUND ART

Patent Document 1 discloses a technique, when a sheet-like exterior member is attached to electrical wires, for positioning the exterior member with respect to the electrical wires by winding a tape around each end portion of the exterior member and the electrical wires extending from the end portion.

PRIOR ART DOCUMENTS

Patent Documents

Patent Document 1: Japanese Patent Application Laid-Open No. 2015-72798

SUMMARY

Problem to be Solved by the Invention

Herein, the applicant of the present application proposes, as a new method of fixing the electrical wires and the sheet-like exterior member, a method of directly fixing an insulating covering of the electrical wires and a sheet material by welding.

In a case of a wire harness in which such an insulating covering of the electrical wire and the sheet material are directly welded and fixed, when the electrical wire is bent at a time of incorporating the wire harness into a vehicle, for example, force according to a bending acts as force of separating the electrical wire and the sheet material, and there is a possibility that the electrical wire and the sheet material are separated from each other.

Thus, an object of the present disclosure is to provide a technique capable of suppressing a separation of an electrical wire and a sheet material in a wire harness in which an insulating covering of the electrical wire and a sheet material are directly welded and fixed.

Means to Solve the Problem

A wire harness of the present disclosure is a wire harness including: an electrical wire; a sheet material welded to an insulating covering of the electrical wire disposed on a main surface; and a cover covering at least part of the electrical wire disposed on the sheet material along a longitudinal direction of the electrical wire from an opposite side of the electrical wire from the sheet material and fixed to the sheet material.

Effects of the Invention

According to the present disclosure, a separation of an electrical wire and a sheet material can be suppressed in a wire harness in which an insulating covering of the electrical wire and a sheet material are directly welded and fixed.

DESCRIPTION OF EMBODIMENT(S)

Description of Embodiment of Present Disclosure

Embodiments of the present disclosure are listed and described firstly.

A wire harness of the present disclosure has a configuration described hereinafter.

(1) A wire harness includes: an electrical wire; a sheet material welded to an insulating covering of the electrical wire disposed on a main surface; and a cover covering at least part of the electrical wire disposed on the sheet material along a longitudinal direction of the electrical wire from an opposite side of the electrical wire from the sheet material and fixed to the sheet material.

The cover is provided, thus force of separating the electrical wire and the sheet material can be reduced, and a separation of the electrical wire and the sheet material can be suppressed.

(2) It is considered that the cover is partially provided on the part of the electrical wire disposed on the sheet material along the longitudinal direction of the electrical wire. In this case, the cover is not provided on a part where necessity of the cover is relatively low, thus increase in weight caused by providing the cover can be suppressed.

(3) It is considered that the cover includes a plurality of small cover parts provided at intervals along the longitudinal direction of the electrical wire. In this case, the small cover part can be provided in a position where the cover is necessary.

(4) It is considered that the cover is wholly provided on the part of the electrical wire disposed on the sheet material along the longitudinal direction of the electrical wire. In this case, an intensity of the cover, for example, can be increased.

(5) It is considered that the cover has a part thinner than the sheet material. In this case, increase in weight caused by providing the cover can be suppressed.

(6) It is considered that the cover includes a first part covering an end portion of the part of the electrical wire disposed on the sheet material along the longitudinal direction and a second part covering the part of the electrical wire closer to a middle portion in relation to the end portion along the longitudinal direction, and the first part is thicker than the second part. In this case, an intensity of the cover in the end portion where the separation particularly occurs easily can be increased.

(7) It is considered that a sheet-like base material constituting the cover is folded back, thus the first part is formed thicker than the second part. In this case, the first part and the second part can be easily provided using one type of uniformly flat base material.

(8) It is considered that the cover is partially joined to the sheet material in a plurality of positions at intervals along a width direction of the sheet material in each of one lateral side and the other lateral side of the electrical wire. In this case, the cover hardly comes out of the sheet material.

(9) It is considered that when a part of a welding region part where the insulating covering and the sheet material are welded located on a side closest to an edge portion of the sheet material along the longitudinal direction of the electrical wire is defined as a welding end, the welding end is away from the edge portion in the sheet material, and the cover has an edge cover part covering at least part of the sheet material located closer to the side of the edge portion of the sheet material in relation to the welding end. In this case, when separating force is applied to the electrical wire, the separating force is applied to the edge cover part earlier than the welding end, thus large separating force applied to the welding end is suppressed.

(10) It is considered that the edge cover part covers the welding end. In this case, the welding end can be protected by the edge cover part. Even when separating force is applied to the welding end from a side opposite to the side of the edge portion, the separating force is applied to the edge cover part earlier than the welding end, thus large separating force applied to the welding end is suppressed.

(11) It is considered that when a part of a welding region part where the insulating covering and the sheet material are welded located on a side closest to an edge portion of the sheet material along the longitudinal direction of the electrical wire is defined as a welding end, the welding end is away from the edge portion in the sheet material, and the cover has an edge cover part covering at least part of the sheet material located closer to the side of the edge portion of the sheet material in relation to the welding end, and the edge cover part is provided away from the welding end. In this case, the welding of the welding end to the sheet material and the fixing of the edge cover part to the sheet material are performed in random order, thus a manufacturing condition is eased.

Details of Embodiment of Present Disclosure

Specific examples of a wire harness of the present disclosure are described hereinafter with reference to the drawings. The present invention is not limited to these examples but is described by claims, and it is intended that meanings equivalent to claims and all modifications within a scope of claims are included.

First Embodiment

Figure 1:
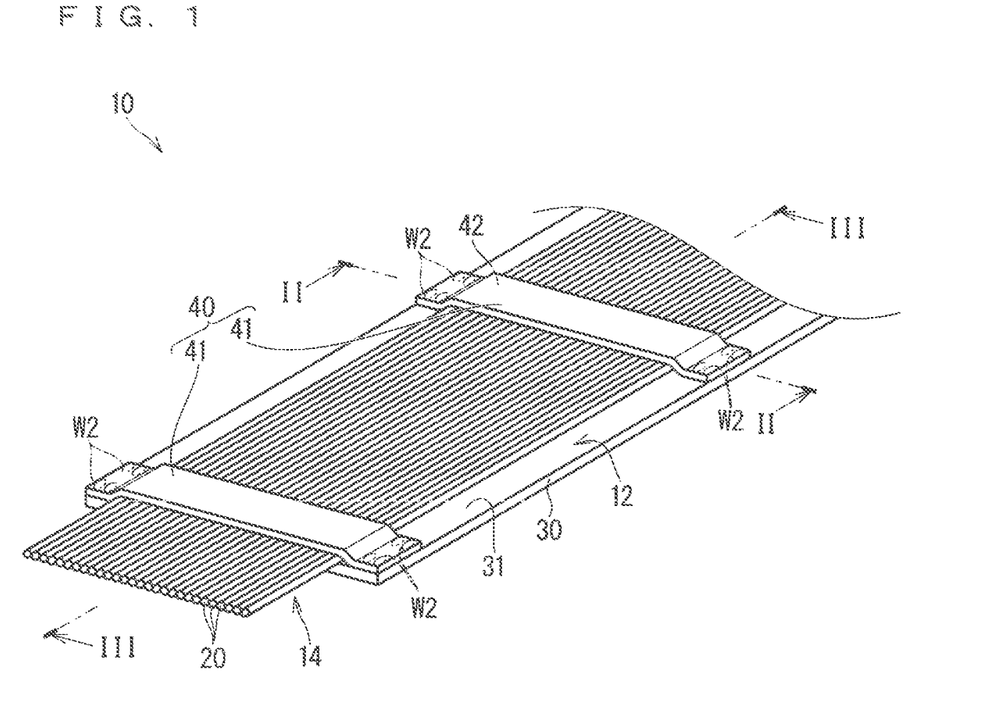
FIG. 1 is a perspective view illustrating a wire harness according to a first embodiment.
Figure 2:
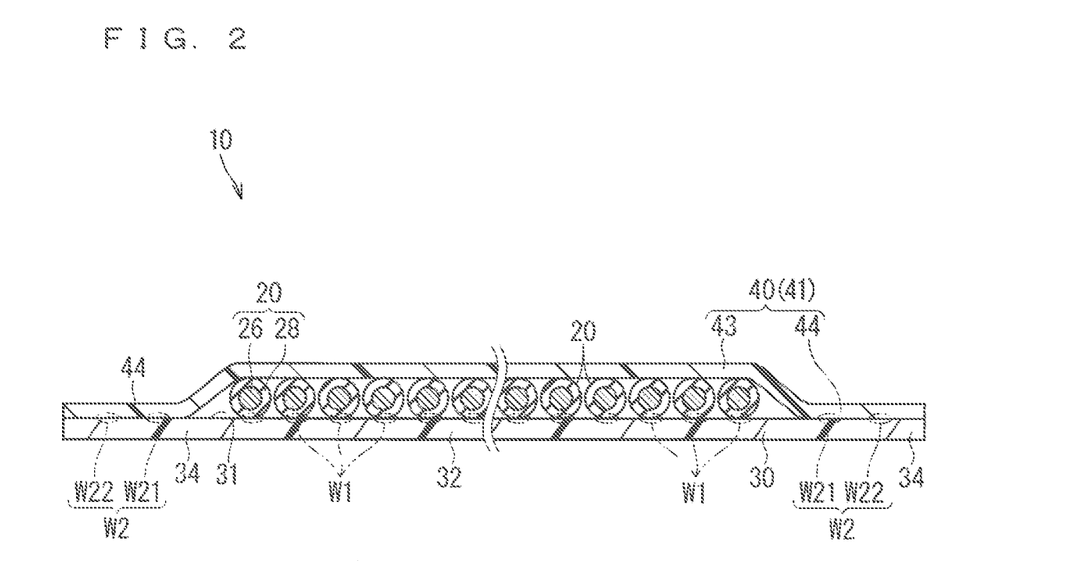
FIG. 2 is a lateral cross-sectional view of the wire harness cut along a II-II line in FIG. 1.
Figure 3:
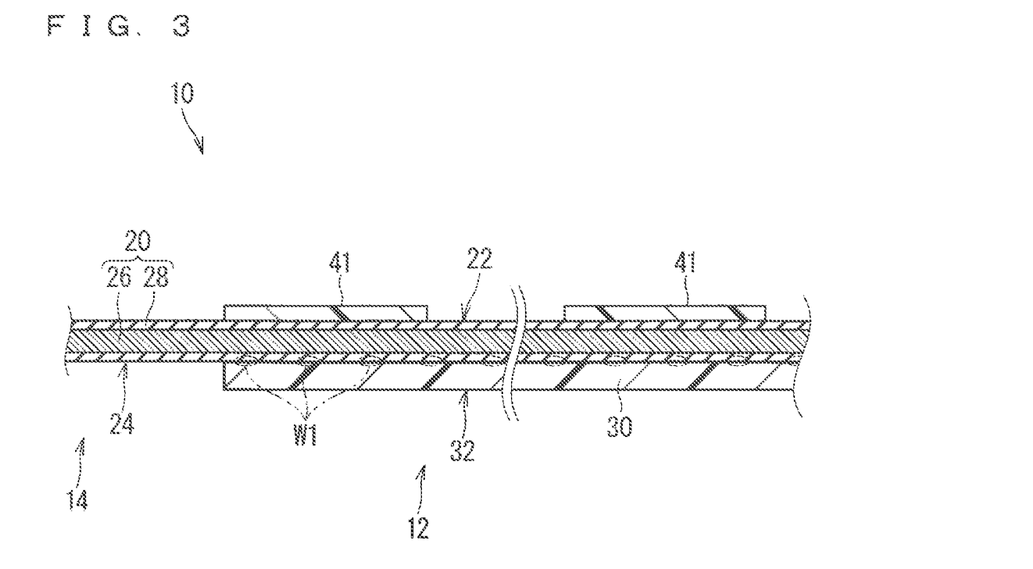
FIG. 3 is a vertical cross-sectional view of the wire harness cut along a III-III line in FIG. 1.

A wire harness according to a first embodiment is described hereinafter. FIG. 1 is a perspective view illustrating a wire harness 10 according to the first embodiment. FIG. 2 is a lateral cross-sectional view of the wire harness cut along a II-II line in FIG. 1. FIG. 3 is a vertical cross-sectional view of the wire harness cut along a III-III line in FIG. 1.

The wire harness 10 includes an electrical wire 20, a sheet material 30, and a cover 40. The wire harness 10 is used as a wire member mounted to a vehicle to electrically connect apparatuses to each other.

The electrical wire 20 is an insulated electrical wire including a core wire 26 and an insulating covering 28 for covering the core wire 26. The insulated electrical wire may be a so-called round wire or an angled wire.

The core wire 26 includes one or a plurality of strands. Each strand is linearly formed of a conductive material such as copper, copper alloy, aluminum, and aluminum alloy, for example. When the core wire 26 includes the plurality of strands, the plurality of strands are preferably stranded.

The insulating covering 28 is formed by extrusion molding of a synthetic resin such as polyvinyl chloride (PVC) or polyethylene (PE) around the core wire 26 or applying an insulation paint such as enamel, for example, around the core wire 26.

A connector is provided on a terminal part, which is not shown in the drawings, of the electrical wire 20, for example. The electrical wire 20 is connected to an apparatus mounted to a vehicle via the connector, for example. For example, the connector includes a connector housing formed of an insulating material and a terminal connected to an end portion of the electrical wire 20 and housed in the connector housing.

The electrical wire 20 is disposed on a main surface 31 of the sheet material 30. The sheet material 30 is welded to the insulating covering 28 of the electrical wire 20 disposed on the main surface 31. A welding position W1 where the insulating covering 28 and the sheet material 30 are welded is appropriately illustrated by a dashed-two dotted line in each drawing. A welding means of welding the sheet material 30 and the insulating covering 28 is not particularly limited, but is considered ultrasonic welding, for example. A material constituting the sheet material 30 is not particularly limited as long as it can be welded to the insulating covering 28. Preferable is a material including resin such as polypropylene (PP) and polyethylene terephthalate (PET) other than PVC and PE described above, and more preferable is a material including the same resin as that constituting the insulating covering 28.

The sheet material 30 is considered to be formed by extrusion molding and have a uniform and filled cross-sectional shape, for example. The sheet material 30 is also considered a non-woven cloth or a foamed sheet, for example. In the description herein, the sheet material 30 has a single-layer structure. Obviously, it is also considered that the sheet material 30 has a multi-layer structure. This configuration is described in detail hereinafter.

In the present specification, a part in the wire harness 10 where the electrical wire 20 and the sheet material 30 are welded is referred to as a welding region part 12. A part located closer to a side of the terminal part in relation to the welding region part 12 is referred to as a terminal side region part 14. In the similar manner, a part in the electrical wire 20 welded to the sheet material 30 is referred to as a welding part 22 and a part located closer to the side of the terminal part in relation to the welding part 22 is referred to as a terminal side part 24. A part in the sheet material 30 welded to the electrical wire 20 is referred to as an electrical wire fixing part 32.

The welding region part 12 is a part including the welding part 22 of the electrical wire 20 and the electrical wire fixing part 32 of the sheet material 30. In the welding region part 12, a plurality of spot welding parts W1 where the insulating covering 28 and the sheet material 30 are partially welded are formed at intervals along an extension direction the electrical wire 20 herein. In the example illustrated in FIG. 1, the spot welding part W1 is formed at a certain pitch, however, there may be a part with a different pitch. However, it is not necessary to form the spot welding part W1 in the welding region part 12, but a continuous welding part where the insulating covering 28 and the sheet material 30 are continuously welded along the longitudinal direction may be formed, for example.

The terminal side region part 14 is a part where the electrical wire 20 and the sheet material 30 are not welded herein. Particularly herein, the terminal side region part 14 is a part made up of the terminal side part 24 extending from an end portion of the sheet material 30 in the electrical wire 20 to an outer side, and does not include the sheet material 30. There may also be a case where the sheet material 30 is included in the terminal side region part 14 such as a case where the end portion of the sheet material 30 is not welded to the electrical wire 20. There may also be a case where a sheet material which is not connected to the sheet material 30 constituting the welding region part 12 is welded to the electrical wire 20 in the terminal side region part 14. Accordingly, the terminal side region part 14 is a part which does not include a sheet material connected to the sheet material 30 constituting the welding region part 12, or a part including a sheet material which is connected to the sheet material 30 but is not welded to the electrical wire 20.

Herein, the terminal side part 24 of the electrical wire 20 is not welded to the sheet material 30. Thus, the plurality of terminal side parts 24 of the electrical wires 20 do not interfere with each other before connected to the connector. This terminal side part 24 is used for inserting a terminal provided on the end portion of the electrical wire 20 into a cavity formed in a connector housing, for example.

A lateral extension part 34 is provided on a lateral side of the electrical wire fixing part 32 in the sheet material 30. The lateral extension parts 34 are provided on both lateral sides of the electrical wire fixing part 32.

The cover 40 covers the electrical wire 20 from an opposite side of the electrical wire 20 from the sheet material 30. The cover 40 is provided to cover at least a part of the electrical wire 20 disposed on the sheet material 30 along the longitudinal direction.

The cover 40 is partially provided on the part of the electrical wire 20 disposed on the sheet material 30 along the longitudinal direction of the electrical wire 20. The cover 40 includes a plurality of smaller cover parts 41. The plurality of small cover parts 41 are provided at intervals along the longitudinal direction of the electrical wire 20. A size of each small cover part 41 along the longitudinal direction of the electrical wire 20 and an interval between the plurality of small cover parts 41 along the longitudinal direction of the electrical wire 20, for example, may be appropriately set.

The cover 40 is fixed to the sheet material 30. Herein, the cover 40 is partially joined to the sheet material 30 in a plurality of positions at intervals along a width direction of the sheet material 30 in each of one lateral side and the other lateral side of the electrical wire 20. A joint part W2 where the sheet material 30 and the cover 40 are joined is appropriately illustrated by a dashed-two dotted line in each drawing.

More specifically, the cover 40 includes a cover piece 43 covering the electrical wire 20 and an extension piece 44 linked to the cover piece 43 and extending to the lateral side of the electrical wire 20. Herein, each small cover part 41 includes the cover piece 43 covering the electrical wire 20 and the extension piece 44 linked to the cover piece 43 and extending to the lateral side of the electrical wire 20. The extension piece 44 is joined to the sheet material 30. Herein, the two extension pieces 44 each linked to both sides of the cover piece 43 are joined to the two lateral extension parts 34 of the sheet material 30, respectively. At this time, the cover 40 is joined to the lateral extension part 34 at two positions in one extension piece 44 along the width direction of the sheet material 30. That is to say, as the joint part W2 where the sheet material 30 and the cover 40 are joined, a first joint part W21 is formed on the lateral side of the electrical wire 20 and a second joint part W22 is formed farther away from the electrical wire 20 than the first joint part W21.

At this time, each of the first joint part W21 and the second joint part W22 is a partial spot joint part along the longitudinal direction of the sheet material 30. Obviously, each of the first joint part W21 and the second joint part W22 may be a continuous joint part continuously formed along the longitudinal direction of the sheet material 30.

A method of joining the lateral extension part 34 of the sheet material 30 and the extension piece 44 of the cover 40 is not particularly limited, however, a joint method by welding, an adhesive agent, or a gluing agent, for example, can be adopted. In the description hereinafter, the lateral extension part 34 and the extension piece 44 are welded to each other, particularly herein, by ultrasonic welding.

The cover 40 has a part thinner than the sheet material 30. Herein, a base material 42 constituting each small cover part 41 is wholly formed thinner than the sheet material 30. Herein, the base material 42 constituting each small cover part 41 is flatly formed with a wholly uniform thickness.

A region where the cover 40 is provided in the sheet material 30 is not particularly limited, however, it is preferable that the region includes a part which is the same as a position of an end portion of the welding region part 12 where the electrical wire 20 and the sheet material 30 are welded or a part provided closer to a side of an end portion of the sheet material 30 than the position. Herein, the end portion of the welding region part 12 is provided on the end portion of the sheet material 30. Accordingly, herein, the cover 40 (the small cover part 41) is provided in the position of the end portion of the welding region part 12 and the position of the end portion of the sheet material 30.

In the case where the wire harness 10 includes the terminal side region part 14 described above, when bending force is applied to the terminal side region part 14, the bending force tends to act as force of separating the electrical wire 20 and the sheet material 30.

In contrast, herein, the cover 40 is provided, thus when the bending force is applied to the electrical wire 20, the separation of the electrical wire 20 and the sheet material 30 hardly occurs.

An operation at a time of applying the bending force to the terminal side region part 14 is described hereinafter. For example, in the description herein, the connector provided on the end portion of the electrical wire 20 is pulled to be moved to an upper side, thus the bending force is applied to the terminal side region part 14. Such an operation may occur when the connector is pulled for a purpose of connecting the connector, for example, at a time of incorporating the wire harness 10 into the vehicle.

When the connector is pulled and the terminal side region part 14 is bent, the welding part 22 of the electrical wire 20 tends to follow the terminal side region part 14. However, the cover 40 is provided on the sheet material 30 herein, thus an edge portion of the cover 40 interferes with the welding part 22 of the electrical wire 20 tending to follow the terminal side region part 14. Accordingly, the force applied to the bending of the terminal side region part 14 hardly acts as the force of separating the electrical wire 20 and the sheet material 30. Particularly herein, the cover 40 is provided on the welding region part 12 or closer to the side of the end portion of the sheet material 30 in relation to the welding region part 12, thus before the force applied to the bending of the terminal side region part 14 acts as the force acting on the separation of the electrical wire 20 and the sheet material 30, the edge portion of the cover 40 interferes with the electrical wire 20 tending to follow the terminal side region part 14, and suppresses the further following.

According to the wire harness 10 having the configuration described above, the cover 40 is provided, thus the force of separating the electrical wire 20 and the sheet material 30 can be reduced, and a separation of the electrical wire 20 and the sheet material 30 can be suppressed.

The cover 40 is provided on the part of the electrical wire 20 disposed on the sheet material 30 along the longitudinal direction of the electronic wire 20, thus is not provided on the part where necessity of the cover 40 is relatively low, and increase in weight caused by providing the cover 40 can be suppressed. Particularly, the cover 40 includes the plurality of small cover parts 41 provided at intervals along the longitudinal direction of the electrical wire 20, thus the small cover part 41 can be provided in a position where the cover 40 is necessary.

The cover 40 has the part thinner than the sheet material 30, thus increase in weight caused by providing the cover 40 can be suppressed.

The cover 40 is partially joined to the sheet material 30 in the plurality of positions at intervals along the width direction in each of one lateral side and the other lateral side of the electrical wire 20, thus the cover 40 hardly comes out of the sheet material 30. More specifically, the first joint part W21 and the second joint pan W22 are away from each other, thus when one of the first joint part W21 and the second joint part W22 is separated, the other one of the first joint part W21 and the second joint part W22 is hardly separated sequentially. In a state where the first joint part W21 is separated, when the cover 40 further supports the bending force, the cover 40 is bowed, thus the second joint part W22 is hardly separated.

Second Embodiment

Figure 4:
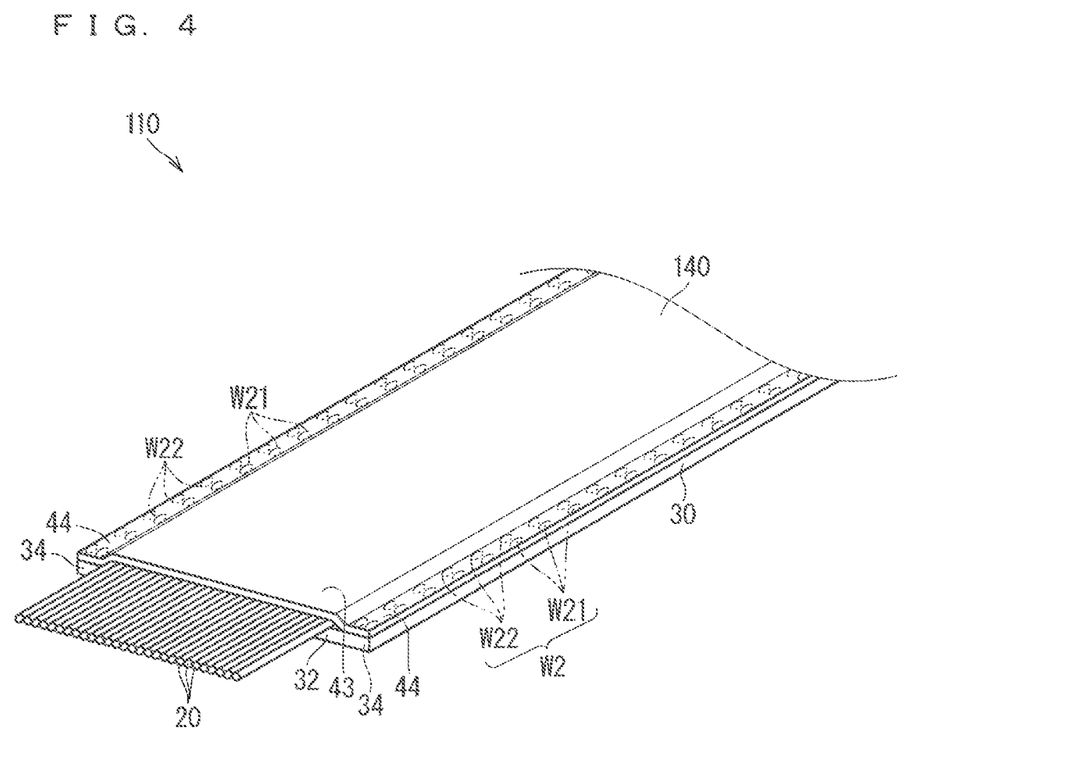
FIG. 4 is a perspective view illustrating a wire harness according to a second embodiment.

A wire harness according to a second embodiment is described. FIG. 4 is a perspective view illustrating a wire harness 110 according to the second embodiment. In the following description, the same reference numerals are assigned to the similar constituent elements described above, and the description thereof will be omitted.

In the description of the first embodiment, the cover 40 is provided on the part of the electrical wire 20 disposed on the sheet material 30 along the longitudinal direction of the electronic wire 20, however, this configuration is not necessary. For example, it is also considered that a cover 140 is wholly provided on a part of the electrical wire 20 disposed on the sheet material 30 along the longitudinal direction of the electrical wire 20 as is the case in the wire harness 110.

According to the wire harness 110 having such a configuration, an intensity of the cover 140, for example, can be increased.

Third Embodiment

Figure 5:
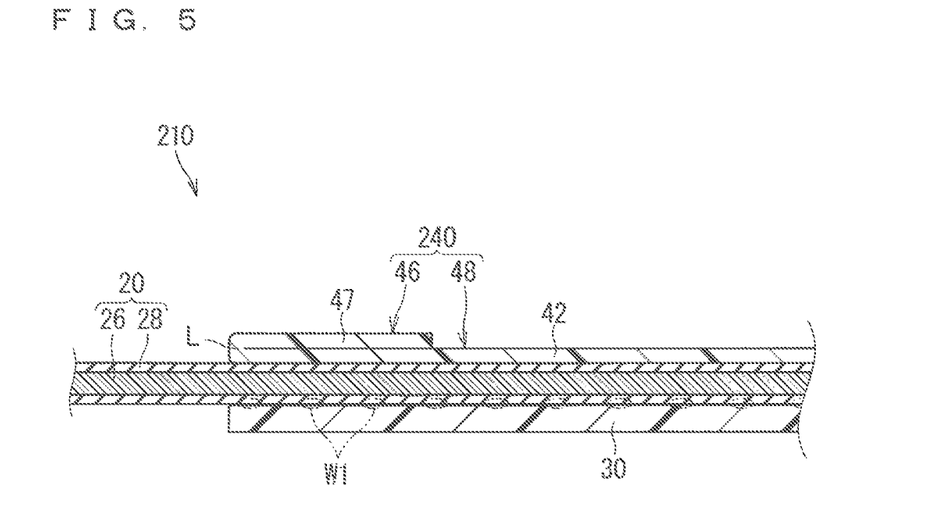
FIG. 5 is a vertical cross-sectional view illustrating a wire harness according to a third embodiment.

A wire harness according to a third embodiment is described. FIG. 5 is a vertical cross-sectional view illustrating a wire harness 210 according to the third embodiment.

In the above description, the cover 40 disposed along the longitudinal direction of the electrical wire 20 has a constant thickness, however, this configuration is not necessary. For example, it is also considered that a cover 240 disposed along the longitudinal direction of the electrical wire 20 has a part with a different thickness as is the case in the wire harness 210.

More specifically, the cover 240 includes a first part 46 and a second part 48. The first part 46 is a part covering an end portion of the electrical wire 20 disposed on the sheet material 30 along the longitudinal direction. The second part 48 is a part covering a part of the electrical wire 20 closer to a middle portion in relation to the first portion 46 along the longitudinal direction. The first part 46 is formed thicker than the second part 48.

The first part 46 may be thicker or thinner than the sheet material 30, or may also have the same thickness as the sheet material 30. In the similar manner, the second part 48 may be thicker or thinner than the sheet material 30, or may also have the same thickness as the sheet material 30.

Herein, the first part 46 is formed thicker than the second part 48 by folding back a sheet-like base material 42 constituting the cover 40. In the description hereinafter, when length dimensions of both side portions bordered by a fold line L of the base material 42 are different from each other, a shorter side thereof is defined as a fold piece 47. At this time, in the example illustrated in FIG. 5, the base material 42 is folded back so that the fold piece 47 is located on an outer side to form the first part 46 of the cover 40, however, this configuration is not necessary. As is a case in a wire harness 210A according to a modification example illustrated in FIG. 6, it is also applicable that the base material 42 is folded back so that the fold piece 47 is located on an inner side to form a first part 46A of a cover 240A.

In the example illustrated in FIG. 5, the cover 240 is configured to cover the whole electrical wire 20 disposed on the sheet in the manner similar to the wire harness 110 according to the second embodiment, however, this configuration is not necessary. There may also be a case where the cover is configured to cover a part of the electrical wire 20 disposed on the sheet. Particularly, when the cover includes the plurality of small cover parts 41 as is the case in the wire harness 10 according to the first embodiment, it is considered that the first part 46 and the second part 48 each having a thickness different from each other are formed in one small cover part 41. It is also considered that a first small cover part 41 on the side of the end portion wholly constitutes the first part 46 by folding the base material 42 at a center, and a second small cover part 41 away from the first small cover part 41 toward a side of the middle portion is not folded back, thereby wholly constituting the second part 48, for example. When the small cover part 41 is folded back, the fold line L may be directed to the side of the end portion in the manner similar to the example illustrated in FIG. 5 or may be directed to a direction opposite to that in the example illustrated in FIG. 5, that is to say, the side of the middle portion.

Figure 6:
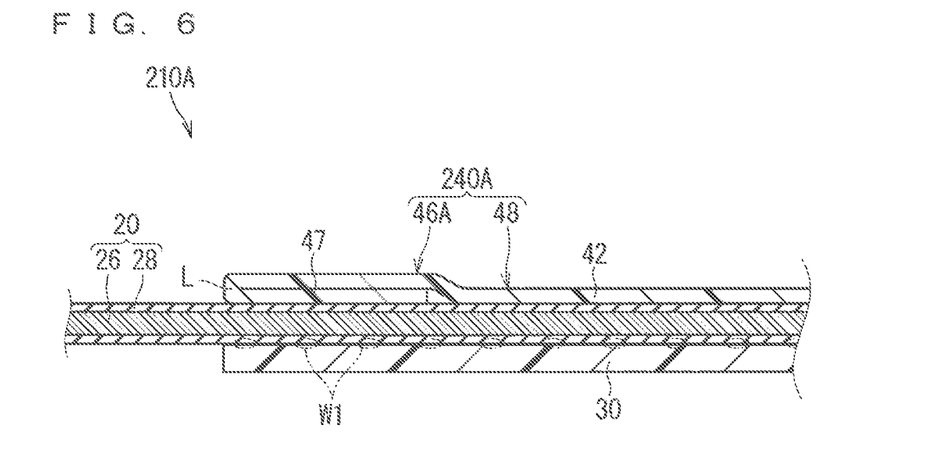
FIG. 6 is a vertical cross-sectional view illustrating a modification example of the wire harness according to the third embodiment.

According to the wire harnesses 210 and 210A having such a configuration, the first parts 46 and 46A on the end portion have the larger thickness than the second part 48 located closer to the middle portion, thus the intensity of the covers 240 and 240A on the end portion where the separation particularly tends to occur can be increased.

The base material 42 is folded back and the first parts 46 and 46A and the second part 48 are formed, thus the first parts 46 and 46A and the second part 48 having the different thickness can be easily provided using one type of uniformly flat base material 42 as the base material 42 of the covers 240 and 240A. The fold piece 47 formed by folding back the base material 42 of the covers 240 and 240A may be or may not be joined to a main body of the covers 240 and 240A in a part other than the joint part W2 joined to the sheet material 30.

Obviously, also considered is a case where the thickness of the base material 42 itself is varied in forming the first part and the second part in the cover. Particularly, when the plurality of small cover parts 41 are provided, the base material 42 having the different thickness can be easily adopted while flattening the base material 42. Also considered is a case where the other plural base materials 42 are joined in the first part to have a thickness larger than the second part in forming the first part and the second part in the cover.

Modification Example

Figure 7:
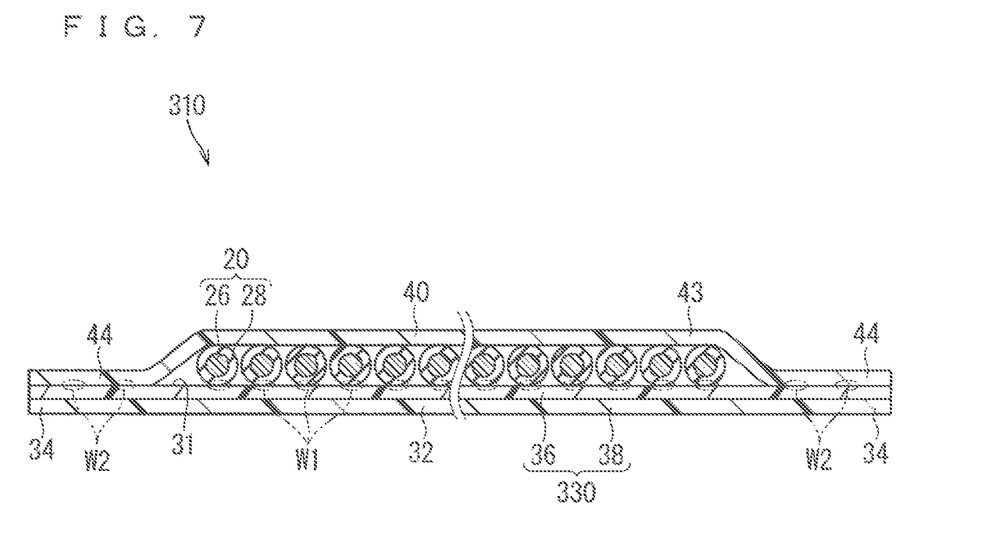
FIG. 7 is a lateral cross-sectional view illustrating a modification example of a sheet material and a wire harness including the sheet material.

FIG. 7 is a lateral cross-sectional view illustrating a modification example of the sheet material 30 and a wire harness 310 including this sheet material 330.

As described above, it is also considered that the sheet material 330 has a multi-layer structure. When the sheet material 330 has the multi-layer structure, a layer including the main surface 31 on which the electrical wire 20 described above is disposed constitutes an electrical wire fixing layer to which the electrical wire 20 is welded, and the other layer is appropriately selected in consideration of the function required of the sheet material 330. Specifically, the example illustrated in FIG. 7 shows an example of the sheet material 330 having a two-layer structure. The sheet material 330 includes a first layer 36 and a second layer 38.

The first layer 36 constitutes the electrical wire fixing layer. The first layer 36 is more appropriate for the welding to the electrical wire 20 than the second layer 38. The first layer 36 is formed of the same material as the insulating covering 28 of the electrical wire 20, for example. Accordingly, when the insulating covering 28 is formed of a material such as PVC and PE, for example, the first layer 36 is also formed of a material such as PVC and PE. Thus, a welding intensity between the sheet material 30 and the insulating covering 28 can be increased. The first layer 36 is formed by extrusion molding and has a uniform and filled lateral cross-sectional shape, for example. Obviously, the first layer 36 is considered a woven cloth, a non-woven cloth, or a foam sheet, for example.

The second layer 38 is a layer appropriately selected in consideration of the function required of the sheet material 330. For example, the second layer 38 is considered a non-woven cloth formed of a material such as PET. Accordingly, the second layer 38 can be lighter in weight than the first layer 36, and abrasion resistance properties can be increased, for example. Obviously, it is also considered that a material such as PP or PE other than PET is adopted as the material of the second layer 38, and the second layer 38 has a structure of a uniform and filled sheet formed by extrusion molding, a woven cloth, or a foam sheet, for example.

At this time, it is also considered that the second layer 38 and the cover 40 are formed of the same material. It is also considered that the second layer 38 and the cover 40 have the same structure. For example, when the second layer 38 is a non-woven cloth formed of a material such as PET described above, the cover 40 is also considered a non-woven cloth formed of a material such as PET. Obviously, it is also considered that the cover 40 is formed of a material different from the second layer 38 or has a structure different from the second layer 38.

The first layer 36 and the second layer 38 in the sheet material 330 is preferably joined to each other in advance. A method of joining the first layer 36 and the second layer 38 is not particularly limited. For example, when the first layer 36 and the second layer 38 are once formed as different sheet-like members separately as is a case where they are formed, by different manufacturing method, of extrusion molding and a non-woven cloth, for example, it is considered that the plurality of sheet-like members separately formed are joined by a calendar roll. When the first layer 36 and the second layer 38 are formed by the same manufacturing method such as extrusion molding, it is also considered that they are stacked in layers during the manufacturing process.

Figure 8:
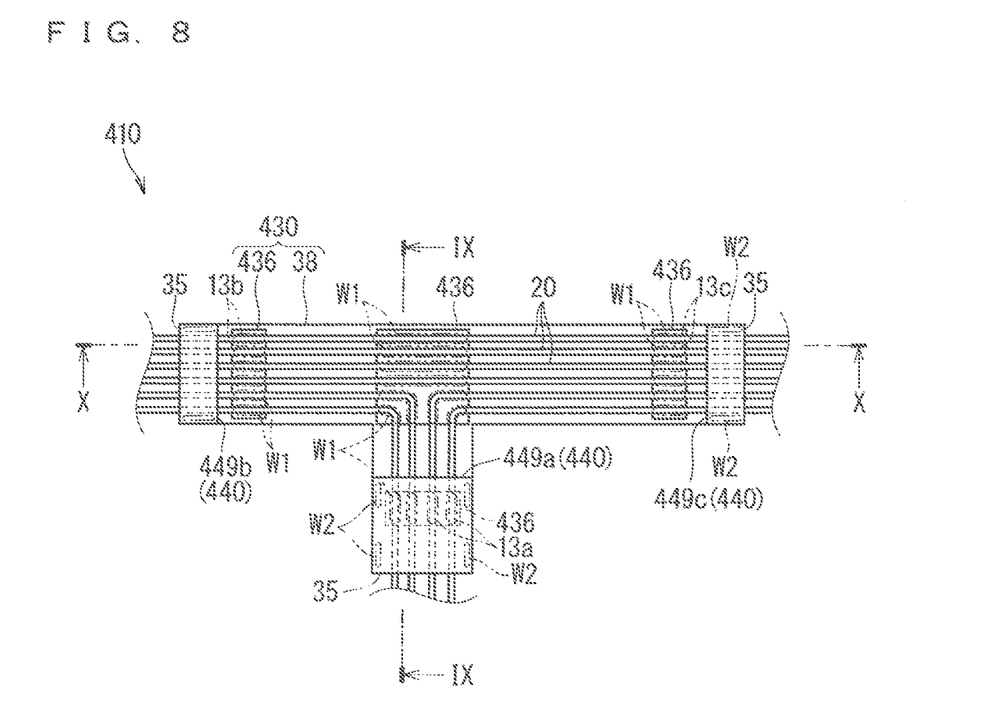
FIG. 8 is a plan view illustrating a wire harness according to another modification example.
Figure 9:
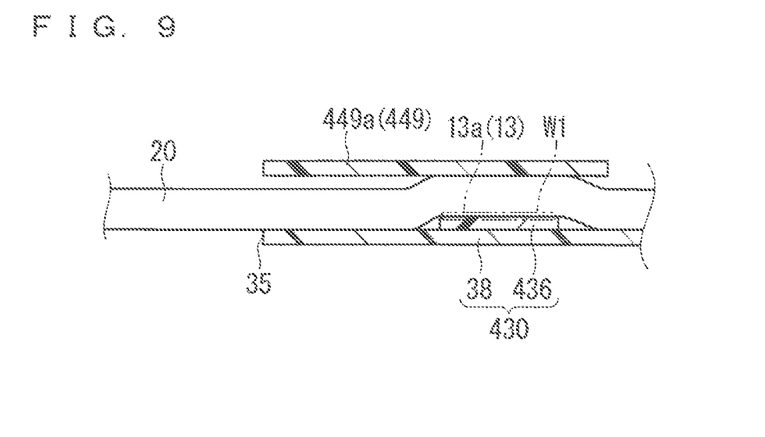
FIG. 9 is a vertical cross-sectional view of the wire harness cut along an IX-IX line in FIG. 8.
Figure 10:
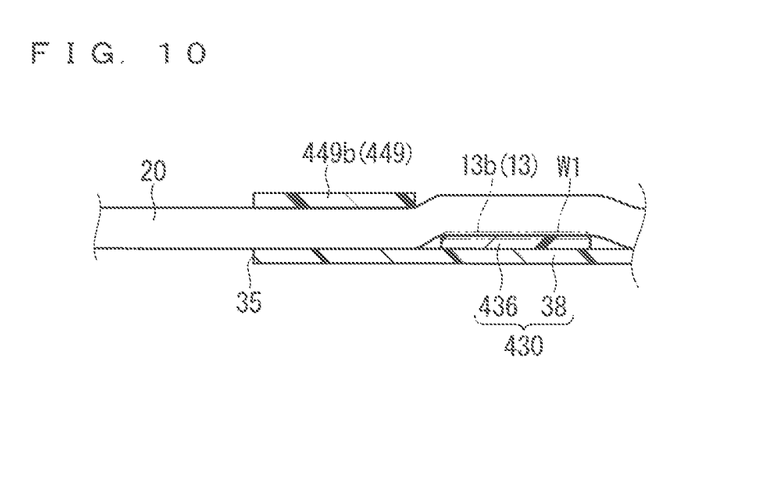
FIG. 10 is a vertical cross-sectional view of the wire harness cut along an X-X line in FIG. 8.

FIG. 8 is a plan view illustrating a wire harness 410 according to another modification example. FIG. 9 is a vertical cross-sectional view of the wire harness cut along an IX-IX line in FIG. 8. FIG. 10 is a vertical cross-sectional view of the wire harness cut along an X-X line in FIG. 8.

In the wire harness 410, a part of the welding region part 12 between the insulating covering 28 and the sheet material 430 located on a side closest to an edge portion of the sheet material 430 along the longitudinal direction of the electrical wire 20 is defined as a welding end 13. The welding end 13 is away from an edge portion 35 in the sheet material 430. For example, the welding end 13 is one millimeter or more away from the edge portion 35 in the sheet material 430. Accordingly, the present example is a case example that the edge portion 35 of the sheet material 430 is included in the terminal side region part 14. A cover 440 has an edge cover part 449. The edge cover part 449 covers at least a part of the sheet material 430 closer to a side of the edge portion 35 in relation to the welding end 13.

In the present example, the sheet material 430 is formed into a T-like shape in a plan view. The electrical wire 20 is disposed to correspond to the T-shaped sheet material 430. The electrical wires 20 extend from each of the three edge portions 35 in the sheet material 430. The welding end 13 and the edge cover part 449 are located in position corresponding to each of the three edge portion 35. The same alphabetical code may be assigned to the corresponding welding end 13 and the edge cover part 449 in some cases hereinafter.

In the present example, the sheet material 430 includes a plurality of first layers 436 and one second layer 38. The plurality of first layers 436 are alternately provided at intervals on one second layer 38. The insulating covering 28 is welded to the first layer 436 in an area overlapping with the first layer 436. Each first layer 436 is welded to the insulating covering 28, thus the plurality of spot welding parts W1 are formed. In the example illustrated in FIG. 8, the area where the insulating covering 28 overlaps with the first layer 436 is wholly welded. That is to say, one spot welding part W1 is continuously formed along the longitudinal direction of the electrical wiring 20 in one first layer 436. Obviously, only a part of the area where the insulating covering 28 overlaps with one first layer 436 may be welded. In the first layer 436, only one spot welding part W1 may be formed for one electrical wire, and the plurality of spot welding parts W1 may also be formed.

An edge cover part 449a covers a welding end 13a. The edge cover part 449a wholly covers the continuous spot welding part W1 linked to the welding end 13a. The edge cover part 449a may cover only a part of the continuous spot welding part W1 linked to the welding end 13a. The edge cover part 449a wholly covers the first layer 436 on which the welding end 13a is provided. The edge cover part 449a may cover only a part of the first layer 436 on which the welding end 13a is provided.

An edge cover part 449b does not cover a welding end 13b but is provided away from the welding end 13b. The edge cover part 449b does not cover the first layer 436 on which the welding end 13b is provided but is provided away from the first layer 436. In a case where the welding end 13b is provided on a middle portion of the first layer 436, the edge cover part 449b may cover the first layer 436 when the edge cover part 449b does not cover the welding end 13b. The same applies to a relationship between a welding end 13c and an edge cover part 449c.

The edge cover parts 449a, 449b, and 449c are provided on the small cover parts 41 different from each other, respectively. That is to say, the cover 440 includes the small cover part 41 having the edge cover part 449a, the small cover part 41 having the edge cover part 449b, and the small cover part 41 having the edge cover part 449c. Two of the edge cover parts 449a, 449b, and 449c may be provided on one small cover part.

A width dimension of the first layer 436 is smaller than that of the second layer 38. The first layer 436 is provided on a middle portion of the second layer 38 in a width direction. The edge cover part 449 is joined to the second layer 38. The joint form of the edge cover part 449 and the second layer 38 is not particularly limited, however, the joint form described above such as welding can be applied. The edge cover part 449 may be joined to the first layer 436.

A non-woven cloth is considered to be adopted to increase abrasion resistance properties, for example, as a material of the second layer 38. When the material of the second layer 38 is a non-woven cloth, it is considered that a member having a higher flame resistance than the second layer 38 (for example, a uniform and filled resin sheet) is adopted as a material of the first layer 436 and the cover 440. In a structural viewpoint, the resin sheet having a uniform and filled structure does not have a hole (air space) inside, thus the spread of flame hardly occurs compared with a non-woven cloth which is a porous fiber assembly. Accordingly, when the non-woven cloth is adopted as the material of the second layer 38, a uniform and filled resin sheet is adopted as the material of the first layer 436 and the cover 440, thus burning resistance of the wire harness 410 is improved.

According to the wire harness 410, when separating force is applied to the electrical wiring 20, the separating force is applied to the edge cover part 449 earlier than the welding end 13. Thus, large separating force applied to the welding end 13 is suppressed, and the electrical wiring 20 and the sheet material 430 are hardly separated.

The edge cover part 449a covers the welding end 13a. The welding end 13a can be protected by the edge cover part 449a. Even when separating force is applied to the welding end 13a from a side opposite to the side of the edge portion of the sheet material 430, the separating force is applied to the edge cover part 449a earlier than the welding end 13a, thus large separating force applied to the welding end 13a is suppressed.

An edge cover part 449b does not cover the welding end 13b but is provided away from the welding end 13b. The welding of the welding end 13b to the sheet material 430 and the fixing of the edge cover part 449b to the sheet material 430 are performed in random order, thus a manufacturing condition is eased. The same applies to the edge cover part 449c.

The first layer 436 and the cover 440 are provided in different positions on the second layer 38. Thus, increase in a height dimension of the wire harness 410 is suppressed. The first layer 436 and the cover 440 may be provided in the same position on the second layer 38. The first layer 436 may be wholly provided on the second layer 38.

It is not necessary to provide the edge cover part 449a covering the welding end 13a and the edge cover part 449b which does not cover the welding end 13b on one wire harness. It is also applicable to provide only one of the edge cover part 449a covering the welding end 13a and the edge cover part 449b which does not cover the welding end 13b on the wire harness. When only one of the edge cover part covering the welding end and the edge cover part which does not cover the welding end is provided on the wire harness, one cover may be provided to wholly cover the sheet material. When the electrical wires extend from the plurality of edge portions in the sheet material, it is also applicable that the welding end is located on the edge portion in a part of the edge portion, and the welding end is away from the edge portion of the sheet material in the other part of the edge portion.

In the above description, the cover 40 is not joined to the electrical wire 20, however, this configuration is not necessary. There may also be a case where the cover 40 is joined to the electrical wiring 20. At this time, the method of joining the cover 40 and the electrical wiring 20 may be the same as or different from the method of joining the cover 40 and the sheet material 30. When the method of joining the cover 40 and the electrical wiring 20 and the method of joining the cover 40 and the sheet material 30 are the same as each other, for example, an one-sided adhesive tape can be adopted as the cover 40. For example, a configuration in which a double-sided adhesive tape is adhered to the whole width direction of the sheet-like base material 42 can be adopted as the cover 40. When the method of joining the cover 40 and the electrical wiring 20 and the method of joining the cover 40 and the sheet material 30 are different from each other, it is considered that one of the electrical wire 20 and the sheet material 30 is joined to the cover 40 by an adhesive agent or a gluing agent, and the other one of them is welded to the cover 40, for example. The same applies to the covers 140, 240, 240A, and 440.

In the above description, the cover 40 has the part thinner than the sheet material 30, however, this configuration is not necessary. Also considered is a case where the cover 40 does not have the part thinner than the sheet material 30, that is to say, the cover 40 is made up of only a part equal to or thicker than the sheet material 30.

The configurations described in the embodiments and modification examples thereof can be appropriately combined as long as they are not contradictory.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS 10, 110, 210, 210A, 310, 410 wire harness
12 welding region part
13, 13a, 13b, 13c welding end
14 terminal side region part
20 electrical wire
22 welding part
24 terminal side part 26 core wire
28 insulating covering
30, 330, 430 sheet material
31 main surface
32 electrical wire fixing part
34 lateral extension part
35 edge portion
36, 436 first layer
38 second layer
40, 140, 240, 240A, 440 cover
41 small cover part
42 base material
43 cover piece
44 extension piece
46, 46A first part
47 fold piece
48 second part
449, 449a, 449b, 449c edge cover part
W1 welding part
W2 joint part
L fold line

The invention claimed is:

1. A wire harness, comprising:
an electrical wire;
a sheet material welded to an insulating covering of the electrical wire disposed on a main surface; and
a cover covering at least part of the electrical wire disposed on the sheet material along a longitudinal direction of the electrical wire from an opposite side of the electrical wire from the sheet material and fixed to the sheet material,
wherein the cover includes a first part covering an end portion of the part of the electrical wire disposed on the sheet material along the longitudinal direction and a second part covering the part of the electrical wire closer to a middle portion in relation to the end portion along the longitudinal direction, and the first part is thicker than the second part, and
a sheet-like base material constituting the cover is folded back such that the first part is thicker than the second part.

2. The wire harness according to claim 1, wherein the cover is partially provided on the part of the electrical wire disposed on the sheet material along the longitudinal direction of the electrical wire.

3. The wire harness according to claim 2, wherein the cover includes a plurality of small cover parts provided at intervals along the longitudinal direction of the electrical wire.

4. The wire harness according to claim 1, wherein the cover is wholly provided on the part of the electrical wire disposed on the sheet material along the longitudinal direction of the electrical wire.

5. The wire harness according to claim 1, the cover includes a part thinner than the sheet material.

6. A wire harness, comprising: an electrical wire; a sheet material welded to an insulating covering of the electrical wire disposed on a main surface; and a cover covering at least part of the electrical wire disposed on the sheet material along a longitudinal direction of the electrical wire from an opposite side of the electrical wire from the sheet material and fixed to the sheet material,
wherein the cover is partially joined to the sheet material in a plurality of positions at intervals along a width direction of the sheet material in each of opposite ends of the electrical wire in the width direction of the sheet material.

7. A wire harness, comprising: an electrical wire; a sheet material welded to an insulating covering of the electrical wire disposed on a main surface; and a cover covering at least part of the electrical wire disposed on the sheet material along a longitudinal direction of the electrical wire from an opposite side of the electrical wire from the sheet material and fixed to the sheet material, wherein, when a part of a welding region part where the insulating covering and the sheet material are welded located on a side closest to an edge portion of the sheet material along the longitudinal direction of the electrical wire is defined as a welding end, the welding end is away from the edge portion in the sheet material, and the cover includes an edge cover part covering at least part of the sheet material located closer to the side of the edge portion of the sheet material in relation to the welding end.

8. The wire harness according to claim 7, wherein the cover includes a first part covering an end portion of the part of the electrical wire disposed on the sheet material along the longitudinal direction and a second part covering the part of the electrical wire closer to a middle portion in relation to the end portion along the longitudinal direction, and the first part is thicker than the second part.

9. The wire harness according to claim 8, wherein a sheet-like base material constituting the cover is folded back, thus the first part is formed thicker than the second part.

10. The wire harness according to claim 7, wherein the edge cover part covers the welding end.

11. The wire harness according to claim 7, wherein the edge cover part is provided away from the welding end such that the edge cover part does not cover the welding end.

* * * * *